United States Patent
Weinmeister et al.

(10) Patent No.: US 9,262,471 B2
(45) Date of Patent: Feb. 16, 2016

(54) WEIGHT ADJUSTMENT IN A PROBABILISTIC MATCHING SYSTEM BASED ON EXTERNAL DEMOGRAPHIC DATA

(71) Applicant: International Business Machines Corporation, Armonk, NY (US)

(72) Inventors: Karl J. Weinmeister, Austin, TX (US); Yinle Zhou, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 13/960,216

(22) Filed: Aug. 6, 2013

(65) Prior Publication Data
US 2015/0046472 A1     Feb. 12, 2015

(51) Int. Cl.
*G06F 17/30*   (2006.01)

(52) U.S. Cl.
CPC ................. *G06F 17/30386* (2013.01)

(58) Field of Classification Search
USPC ........................................ 707/749, 750, 748
See application file for complete search history.

(56) References Cited

U.S. PATENT DOCUMENTS

| | | | | |
|---|---|---|---|---|
| 5,136,654 | A * | 8/1992 | Ganong, III | G10L 15/10 704/238 |
| 5,659,731 | A * | 8/1997 | Gustafson | |
| 8,321,383 | B2 | 11/2012 | Schumacher et al. | |
| 8,332,366 | B2 | 12/2012 | Schumacher et al. | |
| 2002/0156793 | A1* | 10/2002 | Jaro | G06F 17/30707 |
| 2007/0276844 | A1 | 11/2007 | Segal et al. | |
| 2008/0077573 | A1 | 3/2008 | Weinberg et al. | |
| 2008/0243832 | A1 | 10/2008 | Adams et al. | |
| 2010/0175024 | A1* | 7/2010 | Schumacher et al. | 715/810 |
| 2011/0106821 | A1 | 5/2011 | Hassanzadeh et al. | |

FOREIGN PATENT DOCUMENTS

WO    WO2007143157    * 12/2007  ............... G06F 17/30

OTHER PUBLICATIONS

Scales, DJ. et al.; "Efficient Matching Algorithms for the SOAR/OPS5 Production System"; An IP.com Prior Art Database Technical Disclosure; http://ip.com/IPCOM/150525; Apr. 18, 2007; pp. 1-59.
Winkler, William E.; "Frequency-Based Matching in Fellegi-Sunter Model of Record Linkage"; Bureau of the Census Statistical Research Division, No. RR2000/06; Oct. 4, 2000; pp. 1-14.
Oracle Healthcare Master Person Index Match Engine Reference; Oracle, Release 2.0.2 E25254-02; Aug. 2012; pp. 1-17.

* cited by examiner

*Primary Examiner* — Hung T Vy
(74) *Attorney, Agent, or Firm* — Terry Carroll; Edell, Shapiro & Finnan, LLC

(57) ABSTRACT

A record is received including a token without a corresponding predetermined weight. Information pertaining to the received token is retrieved from at least one of external reference information and historic statistics. A token with a predetermined weight closest to the received token is determined based on the retrieved information. The predetermined weight of the closest token is assigned to the received token and data is matched based on the assigned weight of the received token.

17 Claims, 3 Drawing Sheets

WEIGHT ADJUSTMENT IN A PROBABILISTIC MATCHING SYSTEM BASED ON EXTERNAL DEMOGRAPHIC DATA

BACKGROUND

1. Technical Field

Present invention embodiments relate to probabilistic matching of data records, and more specifically, to assigning a known token weight to a token with an undefined weight based on at least one of external reference information and historic statistics to perform probabilistic matching.

2. Discussion of the Related Art

In probabilistic matching systems, the weights for tokens or symbols (e.g., words, phrases, numbers, dates, etc.) are usually generated from the initial input data and are frequency based. The principle is that the higher the frequency, the lower the weight, i.e., higher token frequencies make the tokens less relevant because they are more common, and therefore, not as distinguishable from other tokens with lower frequencies for record matching. When building a token weight table, not all of the tokens are added to the weight table, but rather, only the most common ones in the input dataset are used and the rarer tokens are assigned a default value which is the highest value in the weight table, thereby indicating their relative rarity.

When matching data records (e.g., in a data records management system), the highest weight may end up causing an incorrect record match or false positive when new records are added or updated with tokens that do not exist in the weight table. For example, a weight table is generated based on the initial data load (e.g., from a database of existing records). This weight table may contain the name-string values (e.g., Bob Jones, John Smith, etc.) with their weights based on a calculation. For example, the token name Alice may have a relative weight of 279 denoted as ALICE|279, the token Aline may be assigned a weight, ALINE|323, while a default weight is assigned a value of 672. However, the weight table does not contain a weight value assigned to "Kylee" which may be because the initial data load does not contain Kylee or that Kylee appears rarely in the initial data load. Thus, if Kylee shows up later as an updating record, it will get the default weight of 672. With this high weight, records with Kylee will have a higher chance to be matched, even when the matched record is not relevant.

Accordingly, traditional approaches to record matching may result in errors that lead to false record matches even when a correct match exists.

BRIEF SUMMARY

According to one embodiment of the present invention, a system receives a record including a token without a corresponding predetermined weight. Information pertaining to the received token is retrieved from at least one of external reference information and historic statistics. A token with a predetermined weight closest to the received token is determined based on the retrieved information. The predetermined weight of the closest token is assigned to the received token and data is matched based on the assigned weight of the received token. Embodiments of the present invention further include a method and computer program product for adjusting weights in a probabilistic matching system in substantially the same manner described above.

DETAILED DESCRIPTION

Present invention embodiments optimize record matching in systems that use data that may change over time (e.g., computerized medical records systems, banking systems, etc.). As mentioned above, the name Kylee may get assigned the highest weight (i.e., a default weight of 672) which may not be the best weight for Kylee and may lead to a higher probability of a false record match. The techniques described herein use data external to the record matching system in order to assign a better suited weight to a given token. For example, if an external source such as a list of popular names is searched, such as the list provided by the Social Security Administration (See e.g., http://www.ssa.gov/cgi-bin/popularnames.cgi), the name Kylee may not be as rare as the default weight of 672 would indicate.

The Social Security Administration (SSA) popular name database may, by way of example, indicate that Kylee in year 2011 has a relative frequency of 0.1145%. The same database may further indicate that the name Alice has a relative frequency of 0.1136%, where Alice's frequency happens to be close to the relative frequency of the name Kylee. Thus, if a record with Kylee and birth year 2011 is added to the records management system, the record may not deserve to get such a high weight of 672. As described above, after an initial data load, Alice is assigned a weight of 279, yet Kylee has almost the same relative frequency as indicated by the SSA data. Accordingly, some tokens that have a relatively high frequency according to external demographic data, may not be captured in the initial setting of weights when an initial data load is processed, and when the tokens appear later, the token may be assigned the highest weight value by default.

The techniques described herein can mitigate errors associated with assigning Kylee a weight of 672 by finding a closer match or matches in the weight tables based on the external reference data. Accordingly, Kylee may be given a weight that is the same or close to the weight assigned to Alice|279 (e.g., Kylee|279 or Kylee|280) instead of the Kylee|672 that would be assigned by traditional approaches. The weights used in this example do not scale linearly with frequency, but are scaled logarithmically.

Accordingly, present invention embodiments exploit external reference data to provide a more balanced approach to assigning weight values to new records added to existing database management systems, records management systems, master data management (MDM) systems, and the like.

Figure 1:
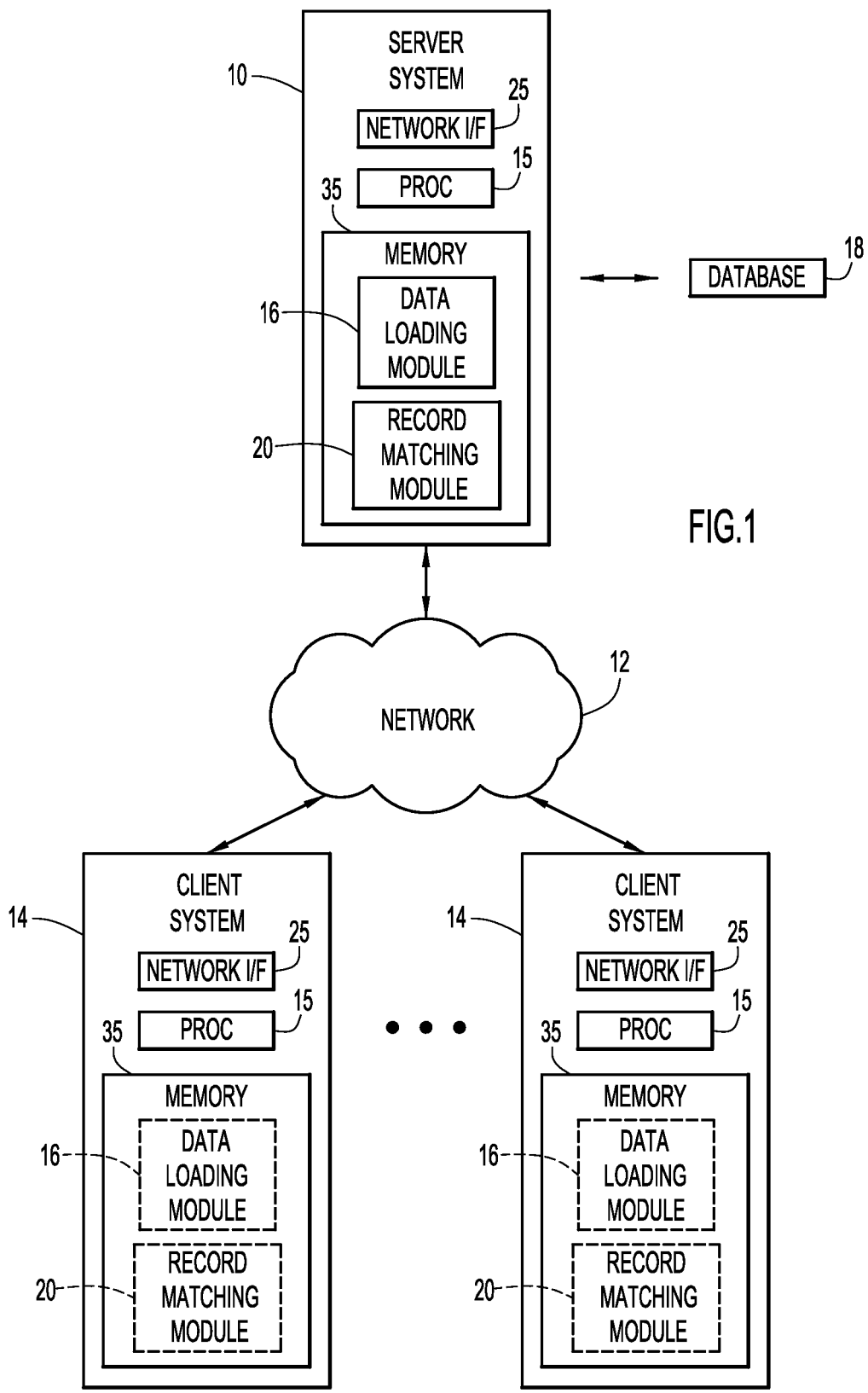
FIG. 1 is a diagrammatic illustration of an example computing environment for use with an embodiment of the present invention.

An example environment for use with present invention embodiments is illustrated in FIG. 1. Specifically, the environment includes one or more server systems 10, and one or more client or end-user systems 14. Server systems 10 and client systems 14 may be remote from each other and communicate over a network 12. The network may be implemented by any number of any suitable communications media (e.g., wide area network (WAN), local area network (LAN), Internet, intranet, etc.). Alternatively, server systems 10 and client systems 14 may be local to each other, and communicate via any appropriate local communication medium (e.g., local area network (LAN), hardwire, wireless link, intranet, etc.).

Server systems 10 and client systems 14 may be implemented by any conventional or other computer systems preferably equipped with a display or monitor (not shown), a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, data loading module 16, record matching module 20, browser/interface software, etc.).

Client systems 14 may receive new record information (e.g., new patient records, new customer records, etc.) or query information related to desired records (e.g., documents, pictures, data records, etc.) and provide the new record or query to server systems 10. In another example, the new records and queries may be received by the server, either directly or indirectly. The server systems include a data loading module 16 to process and assign weights to tokens in an initial data load (e.g., pre-existing database, master data records, etc.), and a record matching module 20 to match and assign weights to new data records using external reference data. A database system 18 may store various forms of data record and weight information (e.g., records, databases, documents, weight tables, etc.). The database system may be implemented by any conventional or other database or storage unit, may be local to or remote from server systems 10 and client systems 14, and may communicate via any appropriate communication medium (e.g., local area network (LAN), wide area network (WAN), Internet, hardwire, wireless link, intranet, etc.).

Client systems 14 may present a graphical user interface (e.g., GUI, etc.) or other interface (e.g., command line prompts, menu screens, etc.) to solicit information from users pertaining to record entries and database queries, and may provide record validation and search results (e.g., records, weights, etc.), such as in reports to the user, which client systems 14 may present via the display or a printer or may send to another device/system for presenting to the user.

Alternatively, one or more client systems 14 may perform record processing when operating as a stand-alone unit. In a stand-alone mode of operation, the client system stores or has access to the data (e.g., record or document repositories, web sites, etc.), and includes data loading module 16 to process and assign weights to tokens in an initial data load and record matching module 20 to match and assign weights to new data records using external reference data. The graphical user interface (e.g., GUI, etc.) or other interface (e.g., command line prompts, menu screens, etc.) solicits information from a corresponding user pertaining to searches such as the search terms and conditions, and may provide reports including search results (e.g., records, weights, etc.).

Data loading module 16 and record matching module 20 may include one or more modules or units to perform the various functions of present invention embodiments described below. The various modules (e.g., data loading module 16, record matching module 20, etc.) may be implemented by any combination of any quantity of software and/or hardware modules or units, and may reside within memory 35 of the server and/or client systems for execution by processor 15. It is to be understood that any of server systems 10 and client systems 14 need not host both the recording module 16 and record matching module 20, but may host one module or the other.

Figure 2:
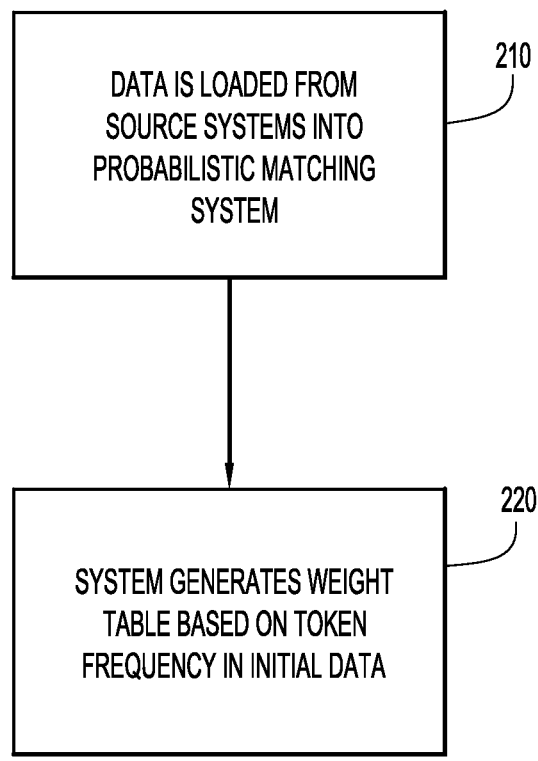
FIG. 2 is a procedural flow chart illustrating a manner in which a system generates weight tables from original source data according to an embodiment of the present invention.

A manner in which data loading module 16 and record matching module 20 (e.g., via server systems 10 and/or client systems 14) performs initial data loading and weight table generation according to an embodiment of the present invention is illustrated in FIG. 2. Specifically, data is loaded from one or more source systems into a probabilistic matching system (e.g., a server system 10 using data loading module 16) at step 210. The data load may be initiated by a user or by a system mining or compiling data (e.g., medical, corporate, or legal data management systems, etc.) using existing data. The source data may have been originally processed by multiple database systems. For example, companies or professional practices may merge, while their associated data management system may employ data management systems from different vendors.

Once the initial data are loaded, the system (e.g., via server systems 10 and/or client systems 14) generates weight tables based on the frequency of tokens within the initial data load at step 220. Specifically, the initial data are analyzed to generate token frequencies within the initial data (e.g., by data loading module 16). When data are analyzed from different sources, these data are combined or merged into the initial data set (e.g., using bulk data matching as described below). When combined, these data may need to have their associated weights adjusted through the use of external reference data to balance the weights based on differing frequencies in the data sets to be combined into the initial data set (e.g., by record matching module 20). The database that results from the initial data load (e.g., by data loading module 16 and record matching module 20) can be used for continued access and record management.

Figure 3:
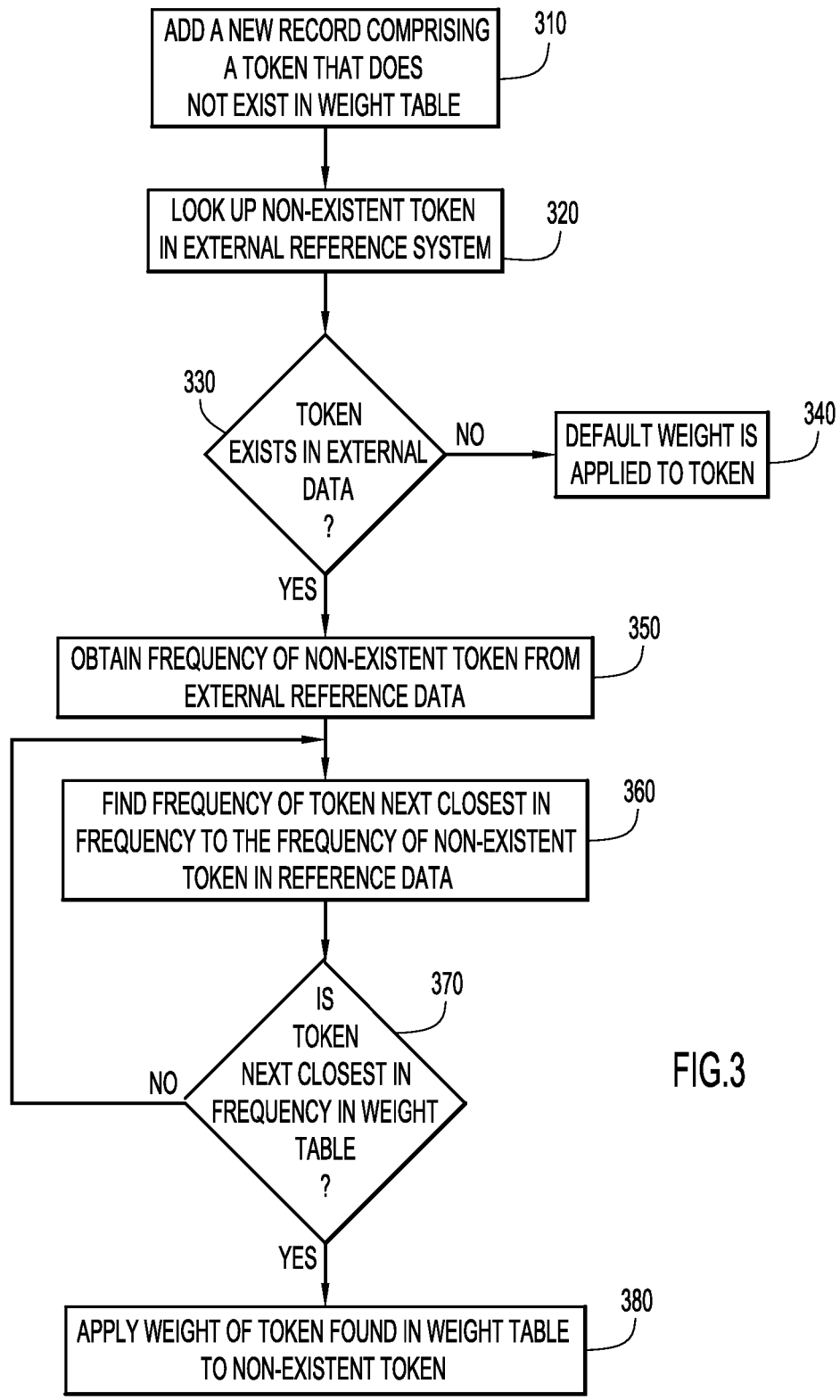
FIG. 3 is a procedural flow chart illustrating a manner in which a weight is assigned to a token of a new record according to an embodiment of the present invention.

A manner in which data loading module 16 and record matching module 20 (e.g., via server systems 10 and/or client systems 14) performs weight adjustment for a new record according to an embodiment of the present invention is illustrated in FIG. 3. Specifically, a new data record is added (e.g., to the initial database) that includes a token that is not present or does not exist in the weight table at step 310. The act of adding the new record may automatically initiate one or more queries using tokens within the new record. The queries may include queries directed to the database and one or more external reference databases.

The non-existent token is looked up in an external reference system at step 320 (e.g., by record matching module 20). The external reference system stores data that may be accessed by the public (e.g., data compiled and provided by a government agency), within a private database (e.g., Lexus-Nexis®), or be within other private or open source data. The external reference data may be preprocessed to tokenize and weight the tokens therein (e.g., by data loading module 16, in a fashion similar to that performed in steps 210 and 220 described above). The processed external reference data can be stored as token lookup tables for simplicity of access.

If the non-existent token does not exist in the external reference data as determined at step 330, a default weight is assigned to the non-existent token at step 340 (e.g., by record matching module 20). In order to determine if the non-existent token is available in the external reference data, the system may use other tokens in the data record associated with the non-existent token such as temporal, local, geographic data, etc. Specific examples for using temporal data and geographic data (e.g., birth year and birth location) are described below.

With reference to the above example for the name "Kylee", if the non-existent token (e.g., Kylee) exists in the external reference data as determined at step 330, the system obtains the frequency of the non-existent token from the external reference data at step 350. The system finds a frequency of a token next closest in frequency to the frequency of the non-existent token in the reference data (e.g., the frequency for the token Alice) and obtains the corresponding token (e.g., Alice) at step 360. Whether the token with the next closest frequency is in the weight table is determined at step 370. The closeness is preferably measured using a frequency associated with the token, e.g., using a frequency difference or absolute value of the frequency difference between the non-existent token and the next most closely matching token. If the token next closest in frequency is not in the weight table as determined at step 370, the process returns to step 360 to obtain a token that is next closest in frequency to the frequency of the non-existent token. In other words, the system iteratively searches the external reference data for the token that is closest in frequency to the frequency of the non-existent token, and that token can also be found in the weight table. If the token next closest in frequency is in the weight table (e.g., the token Alice is in the weight table) as determined at step 370, the weight of the token found in the weight table is applied to the non-existent token at step 380.

In another example, a filter may be applied to the external reference data or the associated lookup tables at step 350. In this example, regional or geographically based information may be used to filter the external reference data. With reference to the above example for the name "Kylee", Kylee has a birth year of 2011. Kylee may have specific birth location (e.g., New York, Texas, etc.) in the data record associated with the token Kylee. After searching the external reference data, it is determined that there may be higher relative frequency of the string name Kylee in New York than in Texas. However, given that Kylee has a birth year of 2011, the combination of Texas and 2011, and New York and 2011, reveals that there may be higher relative frequency of the string name Kylee in Texas than in New York.

The weight of the closest token may be used to perform a search of the loaded data using a probabilistic matching system to determine if a matching record is found, or when not found, a record may be added to the loaded data as a new record with a token having the applied weight. Accordingly, a higher default weight (that would otherwise be assigned to a token without a weight) is adjusted to a value based on the external reference data. In other words, a weight that would be applied to a token before consulting the external reference data (e.g., a predetermined default or other weight) is adjusted (up or down) after consulting the external reference data to a weight that better reflects the actual frequency of the token.

In addition, once the external reference data is processed, other tokens in the weight table may be adjusted or validated according to information in the external reference data. When filtering is applied as described above (e.g., geographic filtering), a higher weight would be assigned to the combination of (Kylee|2011|NewYork) with a lower relative frequency than the combination of (Kylee|2011|Texas) with a higher relative frequency.

To illustrate the process, example frequencies that may be found in the SSA database are used in the following example. A new record is added with the name string token "Kylee" that is not found in the weight table, and the new record indicates that Kylee has a birth year of 2011 (e.g., as performed at step 310). The name Kylee is looked up in the SSA external reference database (e.g., by step 320) and is found to exist (e.g., as determined at step 330), and therefore, the default weight may not need to be assigned to the name Kylee. The system searches the SSA database (e.g., at step 350). In that year, Kylee has a relative frequency of 0.1145% in the SSA external reference database. The system finds the frequency of the token next closest in frequency to Kylee (e.g., at step 360) and the name Alice is found and has a relative frequency of 0.1136% that is relatively closest to the frequency of Kylee, i.e., a difference of 0.0009%. In this example, Alice is found in the weight table and Alice's weight may be assigned to the token Kylee (e.g., at step 380).

As described above, SSA data was used as one source of external reference data. The SSA was a compilation of historical data (e.g., baby name frequency by year). Another external data source (e.g., state birth records that contain demographic data) may be used to determine birth name frequency by state. The SSA data and the birth record data may both be used to determine the ultimate weight that is to be applied to tokens without a corresponding weight in the weight table (e.g., using a weighted combination scheme). Furthermore, other types of external reference data may be used such as biometric information, product information, and task related information.

For example, biometric information may be used by law enforcement agencies such as fingerprints, height, weight, eye color, etc. Product information may be used to track quality control (e.g., defects and longevity). The product information may be skewed based on geography. In one example, automobile batteries generally do not have that same longevity in cold climates when compared to their longevity in more temperate climates. External data related to the task at hand may be employed as described next. Medical, law enforcement, product management systems, among other systems, may all use external data related to a specific task or task subset (fingerprint matching, product identification, etc.) involved with the corresponding data management system. Thus, if a task at hand is related to banking, external reference data may include banking data, or if a task at hand is related to medical records, external reference data may include medical data, and so on.

In the above examples, the external reference data has been described relative to task related data, geographical data, historical data, etc. Accordingly, adjusting the predetermined weight of the closest token may be based on at least one of a frequency of the closest token within the external reference information and the historic statistics.

In another embodiment, external reference data may be used to adjust token weights during a bulk data matching process. Bulk data matching is used when a large amount of data from one database is combined with a large amount of data from one or more additional databases. For example, hospital systems or large corporations may merge resulting in a need for combined data. Weights for records or tokens in the combined database can be adjusted using external reference data. For example, a first of two databases may be selected as a foundation or target database that is to receive records from a second database. As each record from the second database is added to the first database during bulk matching, that record's tokens may have their weights adjusted using external reference data according to the techniques described herein.

In another example, data from a legacy data management system may be merged into data from a state of the art system using bulk matching, or a cable television company may want to run an advertising campaign and desires to separate or subtract out certain existing customers from a standard or customized commercial marketing database in order to find potential new customers, thereby reducing the need to expend resources on existing customers during the campaign. The target database may be the existing customer database and the database to be merged or culled into a separate database may be the commercial marketing database. The target data may be pre-processed and loaded (e.g., by data loading module 16) and the commercial marketing database may be processed one record at a time to adjust weights of the tokens therein using external data. The token weights are adjusted to determine whether an existing record should be added or not to the target database, thereby removing records from the commercial marketing database that may not add to the desired advertising campaign. Accordingly, the weights of the tokens may be adjusted during bulk matching (e.g., for bulk data merging or bulk data separation) using the techniques described herein.

It will be appreciated that the embodiments described above and illustrated in the drawings represent only a few of the many ways of implementing weight adjustments in a probabilistic matching system.

The environment of the present invention embodiments may include any number of computer or other processing systems (e.g., client or end-user systems 14, server systems 10, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, data loading module, record matching module, etc.). These systems may include any types of monitors and input devices (e.g., keyboard, mouse, voice recognition, etc.) to enter and/or view information.

It is to be understood that the software (e.g., data loading module, record matching module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., data loading module, record matching module, etc.) may be available on a recordable or computer useable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, intranet, etc.).

The system may employ any number of any conventional or other databases, data stores or storage structures (e.g., files, databases, data structures, data or other repositories, etc.) to store information (e.g., records, weight tables, lookup tables, external reference data links or locations, etc.). The database system may be implemented by any number of any conventional or other databases, data stores or storage structures (e.g., files, databases, data structures, data or other repositories, etc.) to store information (e.g., records, weight tables, lookup tables, external reference data links or locations, etc.). The database system may be included within or coupled to the server and/or client systems. The database systems and/or storage structures may be remote from or local to the computer or other processing systems, and may store any desired data (e.g., records, weight tables, lookup tables, external reference data links or locations, etc.). Further, the various tables (e.g., weight tables, lookup tables, etc.) may be implemented by any conventional or other data structures (e.g., files, arrays, lists, stacks, queues, etc.) to store information, and may be stored in any desired storage unit (e.g., database, data or other repositories, etc.).

Present invention embodiments may be utilized for any type of data (e.g., databases, repositories, document collections, etc.) that may be in any language (e.g. English, Spanish, French, Japanese, etc.), and for assigning and adjusting the weights of various entities (e.g., record weights, token weights, etc.). The data and weights may be stored in any manner described above. Any form of weighting scheme may be employed (e.g., linearly scaled weighting, logarithmically scaled weighting, etc.) using any data parameter associated with a token or record (e.g., token frequency, relative frequency, frequency relative to another data parameter, etc.). The weight adjustment may be performed during or in response to data operations (e.g., loading data, adding data, updating data, etc.).

Weights may be adjusted utilizing any form of external data (e.g., historical, biometrical, statistical, etc.) in any form (e.g., databases, repositories, document collections, etc.). Combinations of external data (e.g., birth year, birth location, etc.) may be utilized to filter data parameters to obtain a more accurate weight adjustment. Data combining may use BOOLEAN operators such as "AND", "OR", or exclusive OR (XOR) to combine data parameters.

Present invention embodiments may be utilized for any form of probabilistic matching system. Such systems may use Bayesian or other statistical models for probability estimation, and compute weights based on the probabilities. The weights may be aggregated to form composite weight or score. The record matching systems may employ various decision algorithms such as maximum expectation, error based, cost based, hybrid models, etc. to determine a record match or non-match condition.

The present invention embodiments may utilize any form of bulk data matching. For example, bulk data matching may be used to "clean up" an existing database by combining or removing existing records. External reference data may be used to determine if a record should be combined or removed. Bulk record matching may use probabilistic matching to link records in various databases, or combine those databases into a single database.

The present invention embodiments may employ any number of any types of user interface (e.g., Graphical User Interface (GUI), command-line, prompt, etc.) for obtaining or providing information (e.g., database identifiers, external databases, database address, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of matching data comprising:
    generating a weight table based on token frequencies within a first set of data;
    receiving a record including a first token;
    determining that the first token does not have a corresponding weight in the weight table;
    retrieving information pertaining to the first token from at least one of external reference information and historic statistics;
    determining a second token with a weight in the weight table that is closest to the first token based on the retrieved information;
    assigning the weight of the second token to the first token;
    matching the record to data included in the first set of data based on the assigned weight of the first token; and
    updating the weight table based on the matching and the retrieved information.

2. The computer-implemented method of claim 1, wherein the matching includes probabilistic matching.

3. The computer-implemented method of claim 1, wherein the external reference information and historic statistics include at least one of demographic information, biometric information, product information, and task related entity information.

4. The computer-implemented method of claim 1, wherein the matching includes bulk matching the first set of data with other sets of data from other data sources based on the updated weight table.

5. The computer-implemented method of claim 1, further comprising:
    assigning the first token a default weight value in response to the absence of information pertaining to the first token within the retrieved information.

6. The computer-implemented method of claim 1, wherein the assigning includes adjusting the weight of the second token based on at least one of a frequency of the second token within the external reference information and the historic statistics.

7. A system for searching content comprising:
    a computer system including at least one processor configured to:
        generate a weight table based on token frequencies within a first set of data;
        receive a record including a first token;
        determine that the first token does not have a corresponding weight in the weight table;
        retrieve information pertaining to the first token from at least one of external reference information and historic statistics;
        determine a second token with a weight in the weight table that is closest to the first token based on the retrieved information;
        assign the weight of the second token to the first token;
        match the record to data included in the first set of data based on the assigned weight of the first token; and
        update the weight table based on the matching and the retrieved information.

8. The system of claim 7, wherein matching includes probabilistic matching.

9. The system of claim 7, wherein the external reference information and historic statistics include at least one of demographic information, biometric information, product information, and task related entity information.

10. The system of claim 7, wherein matching data includes bulk matching the first set of data with other sets of data from other data sources based on the updated weight table.

11. The system of claim 7, and further comprising:
    assigning the first token a default weight value in response to the absence of information pertaining to the first token within the retrieved information.

12. The system of claim 7, wherein assigning includes adjusting the weight of the second token based on at least one of a frequency of the second token within the external reference information and the historic statistics.

13. A computer program product for searching content comprising:
    a non-transitory computer readable storage medium having computer readable program code embodied therewith, the computer readable program code comprising computer readable program code configured to:
        generate a weight table based on token frequencies within a first set of data;
        receive a record including a first token;
        determine that the first token does not have a corresponding weight in the weight table;
        retrieve information pertaining to the first token from at least one of external reference information and historic statistics;

determine a second token with a weight in the weight table that is closest to the first token based on the retrieved information;

assign the weight of the second token to the first token;

match the record to data included in the first set of data based on the assigned weight of the first token; and update the weight table based on the matching and the retrieved information.

14. The computer program product of claim 13, wherein matching includes probabilistic matching.

15. The computer program product of claim 13, wherein the external reference information and historic statistics include at least one of demographic information, biometric information, product information, and task related entity information.

16. The computer program product of claim 13, wherein matching data includes bulk matching the first set of data with other sets of data from other data sources based on the updated weight table.

17. The computer program product of claim 13, wherein assigning includes adjusting the weight of the second token based on at least one of a frequency of the second token within the external reference information and the historic statistics.

* * * * *